United States Patent
Hsu et al.

(10) Patent No.: US 6,408,073 B1
(45) Date of Patent: Jun. 18, 2002

(54) SCRAMBLE CIRCUIT TO PROTECT DATA IN A READ ONLY MEMORY

(75) Inventors: Chih-Jen Hsu, Tainan Hsien; Yuh-Chin Huang, Chiai Hsien; Mu-Chi Hsu, Miaoli Hsien, all of (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/229,584

(22) Filed: Jan. 13, 1999

(30) Foreign Application Priority Data

Oct. 27, 1998 (KR) .......................................... 087117811

(51) Int. Cl.[7] .............................. H04N 7/167; H04L 9/00

(52) U.S. Cl. .............................. 380/20; 380/10; 380/14; 380/9

(58) Field of Search ........................... 380/268, 33, 59, 380/267, 200, 201, 210; 341/50, 86

(56) References Cited

U.S. PATENT DOCUMENTS 5,515,437 A * 5/1996 Katta et al. ................... 380/20
5,894,517 A * 4/1999 Hutchinson et al. ........... 380/9

* cited by examiner

Primary Examiner—Ly V. Hua
(74) Attorney, Agent, or Firm—Nath & Associates PLLC; Harold L. Novick

(57) ABSTRACT

A scramble circuit for protecting data stored in a read only memory is provided including an initial value generator, a shift register, a logic circuit, an adder and a lock circuit. In said scramble circuit, the initial value generator is used to generate an initial value. The shift register is used to selectively load in the initial value and the data stored in the read only memory. The logic circuit is used to process the data stored in the shift register to generate an output transmitted back to the shift register. The adder is used to add the data stored in the read only memory and the data stored in the shift register having the same lengths, so as to obtain scrambled data. The lock circuit is used to output or lock the scrambled data according to a lock signal.

8 Claims, 2 Drawing Sheets

SCRAMBLE CIRCUIT TO PROTECT DATA IN A READ ONLY MEMORY

BACKGROUND OF THE INVENTION

1. Field of the Invention

The present invention relates to a scramble circuit that can be applied in a microprocessor or a micro-controller with a read only memory built therein to prevent the data stored in the read only memory from being illegally copied and used.

2. Description of the Related Art

In an 8-bit single-chip micro-controller, a scramble circuit for protecting data stored in a read only memory (ROM) is usually structured as a 64-byte or 32-byte key table. However, such a key table will occupy a large area on the chip, thus enlarging the chip size and increasing the production cost. In addition, once the key table is revealed, there also exists a danger that the data stored in the read only memory will be illegally read and copied.

SUMMARY OF THE INVENTION

Accordingly, it is an object of the present invention to provide a scramble circuit to protect the data stored in a read only memory. The scramble circuit includes a pseudo random generator and an adder. The pseudo random generator is used to encode the data stored in the read only memory according to an initial value. The adder is used add the encoded data of the pseudo random generator and the data stored in the read only memory to obtain scrambled data. According to the present invention, the scramble circuit only needs a 2-byte key table (initial value) accompanied with a pseudo random generator and an adder, thus greatly shrinking the chip size and lowering the production cost. Because the original data (ROM DATA) can not be predicted, the scrambled data obtained by the pseudo random generator in response to the initial value as well as the original data can hardly be decoded.

It is another object of the present invention to provide a scramble circuit to protect the data stored in a read only memory that utilizes an arithmetic logic circuit (a pseudo random generator and an adder) to encode the data stored in the read only memory according to an initial value, then adds the encoded data and the original data stored in the read only memory to obtain scrambled data. Therefore, no de-scramble circuit can be provided for this scramble circuit, and it is almost impossible to de-scramble the scrambled data.

To realize the above and other objects, the present invention takes both the data stored in the read only memory and the initial value as input variables of the pseudo random generator, then adds the encoded data of the pseudo random generator and the original data stored in the read only memory to obtain the scrambled data. Therefore, no de-scramble circuit can be provided for this scramble circuit, and it is almost impossible to de-scramble the scrambled data.

According to the present invention, the scramble circuit for protecting data stored in a read only memory includes an initial value generator, a shift register, a logic circuit, an adder and a lock circuit. The initial value generator is used to generate an initial value. The shift register is used to selectively load in the initial value and the data stored in the read only memory. The logic circuit is used to process the data stored in the shift register to generate an output transmitted back to the shift register. The adder is used to add the data stored in the read only memory and the data stored in the shift register having the same lengths so as to obtain scrambled data. The lock circuit is used to output or lock the scrambled data according to a lock signal.

In this scramble circuit, the pseudo random generator simultaneously takes the irregular data stored in the read only memory and the initial value of the initial value generator as input variables; therefore, the encoding operation performed is very complicated and dependent on the original data stored in the read only memory.

When the shift register is a 16-bit shift register, the logic circuit can process the data stored in the shift register using a polynomial $f(x)=x^{15}+x^{12}+x^{7}+x+1$ and transmit the output f(x) back to the zeroth bit of the shift register while the remaining bits are shifted. In this case, $x^{15}$, $x^{12}$, $x^{7}$ and x are respectively the fifteenth, twelfth, seventh and first bits of the shift register, and the data stored in the shift register are unchanged after being encoded using an initial value of FFFEH, because $f(X)=1$, and are changed after being encoded using an initial value ranging from 0000H to FFFEH.

Further, the data stored in the read only memory can be loaded in the shift register to increase the scramble complexity when the data stored in the shift register satisfy a predetermined condition. The adder can add the data in the read only memory and the data stored in the shift register having the same lengths to obtain the scrambled data. Moreover, a lock circuit can be provided to output or lock the scrambled data according to a lock signal.

BRIEF DESCRIPTION OF THE DRAWINGS

Further objects, features and advantages of the present invention will become apparent from the following detailed description of a preferred embodiment with reference to the accompanying drawings.

DETAILED DESCRIPTION OF THE PREFERRED EMBODIMENT

To prevent program coding and other information stored in the read only memory from being illegally copied or used, and protecting the intellectual property rights of the inventor, a scramble circuit is often provided in a microprocessor or micro-controller to scramble the original coding and other information stored therein and to prevent these data from being illegally copied or used.

Figure 1:
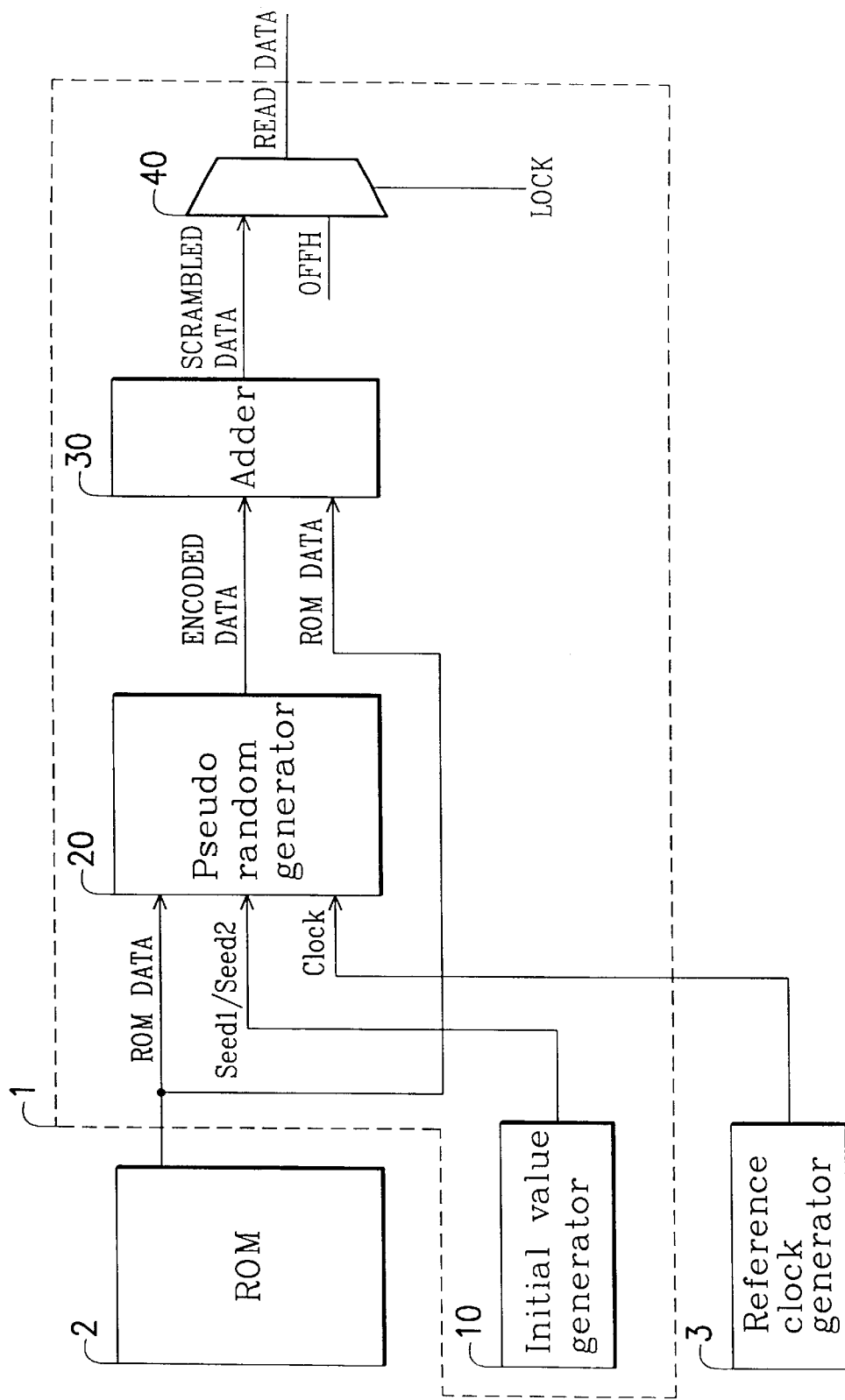
FIG. 1 is a block diagram showing a scramble circuit for protecting data stored in a read only memory according to the present invention.

FIG. 1 is a block diagram showing a scramble circuit for protecting data stored in a read only memory according to an embodiment of the present invention.

As shown in FIG. 1, the data (ROM DATA) to be protected, such as original program coding or other information, are stored in the read only memory 2 which is built inside a micro-processor or a micro-controller. The reference clock generator 3 is provided to generate a system clock CLOCK for the whole micro-controller. The scramble circuit 1 is provided to protect the data (ROM DATA) stored in the read only memory 2, which includes an initial value generator 10, a pseudo random generator 20, an adder 30 and a lock circuit 40.

The initial value generator 10 is provided to generate an initial value (Seed1/Seed2) having two kinds of values exclusive to each other. The initial value (Seed1/Seed2) is also used as an input variable of the pseudo random generator 20.

The pseudo random generator 20 is provided to encode the data (ROM DATA) stored in the read only memory 2 according to the sequence of numbers in the initial value (Seed1/Seed2) and the original data (ROM DATA), thereby generating an encoded data (ENCODED DATA). To increase scramble complexity, the pseudo random generator 20 also takes the data (ROM DATA) stored in the read only memory 2 as another input variable. Because the data (ROM DATA) stored in the read only memory 2 (for example, the program coding and other information) are unpredictable, there exists no descramble circuit for this scramble circuit 1; therefore, it is desirable to save the encrypted pattern of the encoded data (ENCODED DATA) for later verifications.

The adder 30 is provided to add the encoded data (ENCODED DATA) and the original data (ROM DATA) stored in the read only memory 2, further scrambling the encoded data (ENCODED DATA) of the pseudo random generator 20 to obtain the final scrambled data (SCRAMBLED DATA).

The lock circuit 40 is provided to output or lock the scrambled data (SCRAMBLED DATA) according to a lock signal (LOCK). When the lock signal (LOCK) enters a normal situation, the lock circuit 40 works as a buffer and directly outputs the scrambled data (SCRAMBLED DATA) as read data (READ DATA). When the lock signal (LOCK) enters an abnormal situation, the lock circuit 40 works as a lock and outputs a constant high or low voltage as read data (READ DATA).

Figure 2:
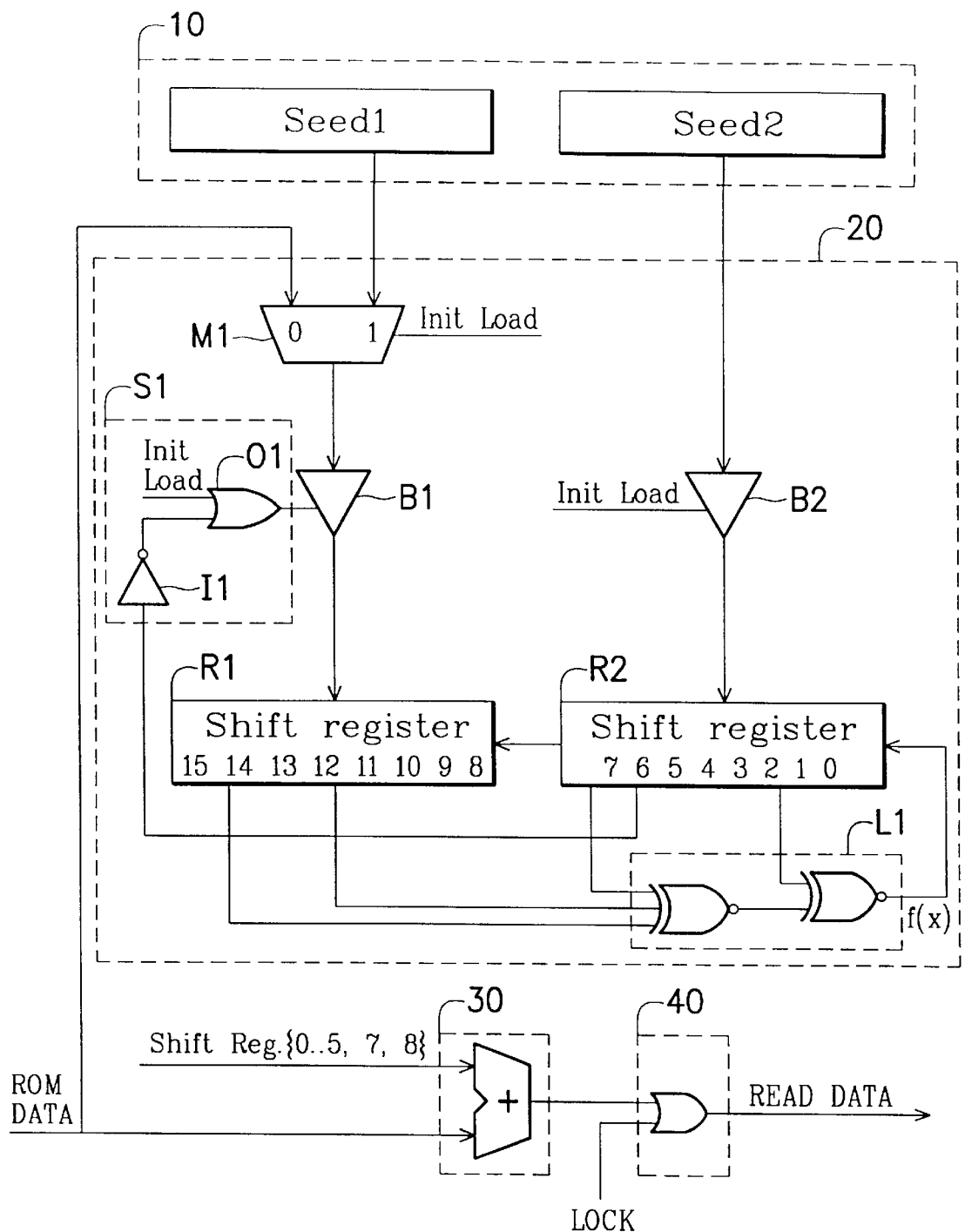
FIG. 2 is a circuit diagram showing a scramble circuit for protecting data stored in a read only memory according to the present invention.

The operations of this embodiment are further described according to FIG. 2, which is a circuit diagram showing the scramble circuit of the present invention.

Similar to FIG. 1, the data (ROM DATA) to be protected, such as original program coding or other information, are stored in the read only memory (not shown) built inside a micro-processor or a micro-controller. The scramble circuit is provided to scramble the data (ROM DATA) stored in the read only memory, which includes an initial value generator 10, a pseudo random generator 20, an adder 30 and a lock circuit 40

In this embodiment, the initial value generator 10 is formed of two 8-bit input units Seed1/Seed2, so as to generate an initial value having two kinds of values exclusive to each other, such as FFFFH and 0000H~FFFEH.

The pseudo random generator 20 is formed of two 8-bit shift registers R1, R2 connected to each other, two buffers B1, B2, a selector M1, an OR gate 01 and an inverter I1. As shown in FIG. 2, two 8-bit input units Seed1/Seed2 are respectively connected to the 8-bit shift register R1 through the buffer B1 and the selector M1, and to the 8-bit shift register R2 through the buffer B2. Further, a load-in circuit S1 composed of the OR gate 01 and the inverter I1 is provided between the buffer B1 and the shift registers R1, R2. When the scramble circuit starts to encode the data (ROM DATA) stored in the read only memory, the initial value stored in the 8-bit input units Seed1/Seed2 of the initial value generator 10 are respectively transferred to the shift register R1 through the selector M1 and the buffer B1, and to the shift register R2 through the buffer B2. Then the buffers B1, B2 are latched, and the logic circuit L1 can process the data stored therein to generate an output sent back to the least significant bit of the shift registers R1, R2, while the remaining bits of the shift registers R1, R2 are shifted to higher bits. In this embodiment, the logic circuit L1 can process the data stored in the shift registers R1, R2 by summing up bits selected from the shift registers R1, R2 and transmit the sum back to the zeroth bit of the shift registers R1, R2. More specifically, the logic circuit L1 processes the data stored in the shift registers R1, R2 according to a polynomial $f(x)=x^{15}+x^{12}+x^7+x+1$, where $x^{15}$, $x^{12}$, $x^7$ and x are respectively the fifteenth, twelfth, seventh and first bits of the shift register. When the initial value is FFFFH, the data stored in the shift register R1, R2 are unchanged even after the processing of the logic circuit L1, because $f(x)=1$. On the other hand, when the initial value ranges from 0000H to FFFEH, the data stored in the shift register R1, R2 are changed after the processing of the logic circuit L1 according to both the initial value and the original data (ROM DATA) stored in the read only memory.

Further, to increase scramble complexity, a load-in circuit S1 can be provided in the pseudo random generator 20 to load in the data stored in the shift registers R1, R2 in certain conditions. In this embodiment, once the sixth bit of the shift register R1, R2 is 0, the load-in circuit S1 will drive the selector M1 and the buffer B1 to load eight bits of the original data (ROM DATA) into the shift register R1. Because the pattern of the data (ROM DATA) stored in the read only memory is unpredictable, the encoded data (ENCODED DATA) of the pseudo random generator 20 can be changed in an irregularly manner and a de-scramble circuit for this scramble circuit is almost impossible to provide.

Further, the adder 30 is provided to add eight bits of the original data (ROM DATA) and eight bits freely selected from the registers R1, R2, so as to generate the scrambled data (SCRAMBLED DATA).

The lock circuit 40 is formed of an OR gate or other logic circuits to output or lock the scrambled data (SCRAMBLED DATA) of the adder 30. When a lock signal (LOCK) enters a normal state, the lock circuit 40 works as a buffer and outputs the scrambled data (SCRAMBLED DATA) of the adder 30 as the read data (READ DATA). When the lock signal (LOCK) enters an abnormal state, the lock circuit 40 works as a lock and outputs a constant high or low as the read data (READ DATA).

In summation, a scramble circuit for protecting the data stored in a read only memory accordingly to the present invention only needs a 2-byte key table, thus greatly reducing the chip size and lowering the production cost. In addition, to increase the scramble complexity, the scramble circuit simultaneously takes the initial value and the original data (ROM DATA) as input variables; thus, it is almost impossible to provide a de-scramble circuit for this scramble circuit.

It should be understood that the present invention is not limited to the preferred embodiment as disclosed above. Variations and modifications can be made by those who are skillful in the art without departing from the spirit and scope of the present invention as defined in the appended claims. Thus, this invention is not to be limited to the disclosed embodiment except as required by the appended claims.

What is claimed is:

1. A scramble circuit for protecting data stored in a read only memory, comprising:
   a pseudo random generator for encoding the data stored in the read only memory according to an initial value, the pseudo random generator comprising:
   a shift register for selectively loading in the initial value and the data stored in the read only memory; and
   a logic circuit for processing the data stored in the shift register using a polynomial $f(x)=x^{15}+x^{12}+x^7+x+1$ when the shift register is a 16-bit shift register, and transmitting the output f(x) back to the zeroth bit of the shift register when the shift register is shifted, where $x^{15}$, $x^{12}$, $x^7$ and x are respectively the fifteenth, twelfth, seventh and first bits of the shift register, wherein the data stored in the shift register are unchanged after being encoded when the initial value is FFFFH and changed after being encoded when the initial value ranges from 0000H to FFFEH; and an adder for adding the encoded data of the pseudo random generator and the data stored in the read only memory to obtain scrambled data.

2. The scramble circuit as claimed in claim 1, wherein the data stored in the read only memory is loaded in the shift register when the data stored in the shift register satisfy a predetermined condition.

3. The scramble circuit as claimed in claim 1, wherein the adder adds the data in the read only memory and the data stored in the shift register having the same lengths to obtain the scrambled data.

4. The scramble circuit as claimed in claim 1, further comprising a lock circuit for outputting or locking the scrambled data according to a lock signal.

5. A scramble circuit for protecting data stored in a read only memory, comprising:

a pseudo random generator for encoding the data stored in the read only memory according to an initial value, the pseudo random generator comprising:
  a shift register for selectively loading in the initial value and the data stored in the read only memory; and
  a logic circuit for processing the data stored in the shift register by summing up bits selected from the shift register and transmitting the sum back to a zeroth bit of the shift register when the shift register is shifted; and an adder for adding the encoded data of the pseudo random generator and the data stored in the read only memory to obtain scrambled data.

6. The scramble circuit as claimed in claim 5, wherein the data stored in the read only memory is loaded in the shift register when the data stored in the shift register satisfy a predetermined condition.

7. The scramble circuit as claimed in claim 5, wherein the adder adds the data in the read only memory and the data stored in the shift register having the same lengths to obtain the scrambled data.

8. The scramble circuit as claimed in claim 5, further comprising a lock circuit for outputting or locking the scrambled data according to a lock signal.

* * * * *